Patented Dec. 5, 1950

2,532,665

UNITED STATES PATENT OFFICE 2,532,665

CALCIUM SILICATE-RUBBER COMPOSITIONS CONTAINING CARBONATE ESTERS AND METHODS OF COMPOUNDING THEREOF

Frederick W. Gage, Akron, Ohio, assignor to Pittsburgh Plate Glass Company, Allegheny County, Pa., a corporation of Pennsylvania No Drawing. Application August 31, 1948, Serial No. 47,139

11 Claims. (Cl. 260—31.4)

This invention relates to a rubber composition and in particular relates to a rubber composition containing butyl rubber and finely divided calcium silicate which can be easily processed and milled.

It is known that desirable rubber compounds may be prepared by incorporating into the rubber compound finely divided calcium silicate having a particle size less than one micron, and having a ratio of $SiO_2$ to $CaO$ not less than 2 to 1, preferably not less than 3 to 1, and thereafter vulcanizing the mixture. The calcium silicate acts as a reenforcing pigment which improves the strength and abrasive qualities of the rubber compound. It can be compounded successfully with natural rubber compositions and certain synthetic rubber compositions such as butadience-styrene copolymers known as GR-S rubber, butadiene-acrylonitrile copolymers, chloroprene, polyvinyl chloride, vinyl chloride-vinyl acetate copolymers, and the like, and also mixtures of natural and such synthetic rubber compositions. However, attempts to compound rubber compositions containing butyl rubber and finely divided calcium silicate as described above have met with considerable difficulty. The milled mass has a tendency to be sticky and to adhere to the rolls and interior of the mill. Various changes in the milling technique have been made to combat this stickiness, but they have proven unsuccessful.

In accordance with this invention it has been found that the addition of a small amount, up to about five percent by weight based on the weight of butyl rubber, of a carbonic acid ester, such as diethylene glycol bis (butoxyethyl) carbonate, to the butyl rubber-calcium silicate rubber composition greatly reduces the stickiness or adhesive character of the unvulcanized composition and the rubber composition is capable of being easily milled. Carbonate esters of the type herein contemplated are generally compatible with most rubber compositions, synthetic resins and plastics and have heretofore been used as plasticizers for such compositions. It has been found that such esters are not compatible to an appreciable degree with butyl rubber and, consequently, it had been thought that addition of such esters to butyl rubber would serve no useful purpose. Despite this incompatibility the use of the contemplated carbonate esters as herein described has been found to be highly advantageous.

In this case, the carbonic acid ester appears to act as a lubricant between the rubber composition and the mill. It bleeds from the rubber compositions and forms a film both on the outside of the rubber composition, and on the mill, thus preventing adherence between the two. Substantially all of the carbonic acid ester bleeds from the rubber composition during the milling operation and prior to vulcanization. Hence the incompatibility of the incorporated ester does not affect the properties of the final vulcanized butyl rubber composition.

The term "butyl" rubber is intended to include copolymers, such as described in U. S. Patent No. 2,442,068, of an olefin, for example, isobutylene, and a diolefin of the group including butadiene, isoprene, dimethyl butadiene, pentadiene, cyclopentadiene and piperylene containing 70 to 99 parts by weight of the olefin and 30 to 1 parts by weight of the diolefin. These copolymers are produced by low temperature polymerization, for example, at substantially minus 95° C. Typical compositions with which the present invention is concerned contain butyl rubber, conventional vulcanization agents and accelerators, softeners, plasticizers, pigments, fillers, etc. In addition a small amount of another synthetic rubber may be present in the composition, however, in such case the butyl rubber is the predominant elastomer present.

A typical example of a rubber composition which is used in the practice of the invention is as follows:

Parts are by weight

| | |
|---|---|
| Butyl rubber | 100 |
| Zinc oxide | 5 |
| Sulfur | 2 |
| Iron oxide | 5 |
| Stearic acid | 1 |
| Tetramethyl thiuram disulfide | 1 |
| 3-anilinomethyl-2(3)-benzothiazole thione | 1 |
| Ethylene glycol | 1.8 |
| Calcium silicate $CaO_1 \cdot (SiO_2)_{3.36}$ | 30 |
| Soft clay | 50 |
| Diethylene glycol bis (butoxyethyl) carbonate | 3 |

The butyl rubber generally is put on a mixing mill first. The mill consists of two rolls revolving at different speeds and heated or cooled as desired. This is known as an "open mill" but in the practice of the invention a Banbury type mill may be employed with equal success. When the rubber has been sufficiently milled, calcium silicate, soft clay or similar filler, and a carbonate ester such as diethylene glycol bis (butoxyethyl) carbonate are added, the mixture is milled, and the remaining compounding ingredients are added and milled into the composition. In each milling step, the operation is carried on for a length of time sufficient to thoroughly incorporate all the materials. After all the ingredients are thoroughly incorporated in the rubber composition, it is sheeted off and permitted to rest for 16–24 hours after which it is cured at a vulcanizing temperature usually 250 to 350° F., for example 316° F., for a period of time sufficient to effect vulcanization to a point where the rubber has optimum strength properties. When a vulcanization temperature of 316° F. is maintained this period usually ranges from 5 to 20 minutes, although longer periods up to two or more hours may be required, depending upon the temperature maintained.

In lieu of the diethylene glycol bis (butoxyethyl) carbonate, numerous other liquid carbonates which may be regarded as esters of (a) a polyhydric saturated aliphatic alcohol or polyhydroxy saturated aliphatic compound in which the hydroxy groups are esterifiable with acids and (b) an acid ester of carbonic acid and an aliphatic, including cyclic aliphatic saturated monohydroxy compound which contains a single hydroxy group which is esterifiable with acids; wherein the hydroxy groups of (a) are esterified with (b) can be used. These esters may be prepared by reaction of the chloroformate of the monohydroxy compound with the polyhydroxy compound or by reacting a polychloroformate such as a bis chloroformate of a dihydric alcohol or dihydroxy compound with a monohydroxy alcohol or hydroxy compound.

Such carbonate esters will have the general structure

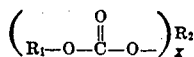

wherein $R_1$ and $R_2$ are like or different aliphatic or halosubstituted aliphatic saturated radicals of alcohols or hydroxy compounds $R_2(OH)_x$ containing an hydroxyl group which is esterifiable by acids and X is a small whole number greater than one, usually being 2 or 3.

Esters of the following polyhydroxy compounds are suitable for use as herein contemplated: glycols or polyglycols such as alkylene glycols, for example, ethylene glycol, trimethylene glycol, 1,4 butane diol, pentamethylene glycol, tetramethylene glycol, propylene glycol, etc., or the polyhydroxy ethers, polyglycols such as the di-, tri-, and tetraethylene glycols, the di-, tri-, and tetrapropylene glycols, and the corresponding butylene glycols or 1,2-dihydroxy-4-ethoxy butane.

The invention is further applicable to esters of higher polyhydric alcohols, such as esters of glycerol, methyl glycerol, sorbitol, mannitol, glycerol monoethyl ether, glycerol monoacetate, glycerol monobutyrate, polyvinyl alcohol, etc.

The esters of various monohydric or monohydroxy compounds are contemplated. These compounds include saturated aliphatic alcohols such as methyl, ethyl, propyl, isopropyl, butyl or isobutyl alcohol or other straight or branched chain paraffin alcohols including those of higher molecular weights such as stearyl, dodecyl, cetyl and melissyl alcohols and also substituted alcohols such as 2,3 dichloropropanol, β chloroethanol and β bromoethanol or other halogen substituted alcohols.

The esters herein contemplated should be fluid liquids at the temperature of vulcanization and should not be polymerizable under vulcanization conditions. While polymerizable esters may be used in connection with this process, sufficient stable inhibitor, such as hydroquinone, cuprous chloride, etc., should be present to inhibit polymerization. It is preferred to use compounds which contain no aliphatic unsatauration in order to avoid the possibility of interaction of the carbonate ester with vulcanizing components of the mixture. Also, it is preferred to use liquid esters which contain no free acid groups. Best results are obtained when esters of unsubstituted alcohols and unsubstituted glycols are used. Typical esters suitable for use as herein contemplated are described in United States Letters Patent Nos. 2,370,567, 2,370,570, 2,379,250 and 2,381,511, granted to Franklin Strain and Irving E. Muskat.

The amount of carbonate ester used depends to a considerable degree upon the nature of the rubber composition since some compositions will require more ester than others. Usually an amount within the range of 0.1 to 5 percent by weight based upon the weight of the butyl rubber is sufficient. Higher concentrations may be used but with excessive concentrations unnecessary milling is required and the property of tack in the butyl rubber is impaired. A small amount, up to about one percent by weight, based upon the weight of butyl rubber, of the carbonate ester is compatible with the butyl rubber and the remainder of the carbonate ester bleeds out to act as a lubricant. Amounts higher than five percent may be necessary when higher milling temperatures are maintained.

As a result of the addition of a carbonate ester as described above, it is possible to mill easily rubber compositions containing butyl rubber and calcium silicate having an average particle size of less than one micron and having a ratio of $SiO_2$ to $CaO$ not less than 2 to 1 nor more than 4 to 1, whereas it has heretofore been exceedingly difficult, if not impossible, to mill such rubber compositions due to their tendency to adhere to the mill. It is also desired that the invention be applied to other butyl rubber-pigment combinations which exhibit stickiness in their milling. Typical pigments are finely divided silica, calcium silicate, aluminum silicate, copper silicate and mixtures thereof.

Although the present invention has been described with reference to specific details of certain embodiments thereof, it is not intended that such details shall be regarded as limitations upon the scope of the invention except to the extent defined by the accompanying claims.

I claim:

1. A vulcanizable rubber composition comprising a hydrocarbon interpolymer of a major proportion of isobutylene with a minor proportion of a polyolefin having 4 to 12, inclusive, carbon atoms per molecule, finely divided calcium silicate having an average particle size less than one micron and having a ratio of $SiO_2$ to $CaO$ not less than 2 to 1 nor more than 4 to 1, and a small amount, sufficient to diminish stickiness but not over 5 percent by weight based on the weight of the interpolymer, of a carbonate ester of (a) a polyhydroxy saturated aliphatic compound in which the hydroxy groups are esterifiable with acids and (b) an acid ester of carbonic acid and an aliphatic saturated monohydroxy compound which contains a single hydroxy group which is esterifiable with acids; wherein the hydroxy groups of (a) are esterified with (b).

2. A vulcanizable rubber composition comprising a hydrocarbon interpolymer of a major proportion of isobutylene with a minor proportion of a polyolefin having 4 to 12, inclusive, carbon atoms per molecule, finely divided calcium silicate having an average particle size of less than one micron and having a ratio of $SiO_2$ to CaO not less than 2 to 1 nor more than 4 to 1, and a small amount, sufficient to diminish stickiness, but not more than five percent by weight based on the weight of interpolymer, of diethylene glycol bis (butoxyethyl) carbonate.

3. In the milling of a rubber composition containing a hydrocarbon interpolymer of a major proportion of isobutylene with a minor proportion of a polyolefin having 4 to 12, inclusive, carbon atoms per molecule and finely divided calcium silicate having an average particle size less than one micron and having a ratio of $SiO_2$ to CaO not less than 2 to 1 nor more than 4 to 1, the improvement which comprises adding in small amount, sufficient to diminish stickiness, but not over 5 percent by weight based upon the weight of interpolymer, of a carbonate ester of (a) a polyhydroxy saturated aliphatic compound in which the hydroxy groups are esterifiable with acids and (b) an acid ester of carbonic acid and an aliphatic saturated monohydroxy compound which contains a single hydroxy group which is esterifiable with acids; wherein the hydroxy groups of (a) are esterified with (b).

4. In the milling of a rubber composition containing a hydrocarbon interpolymer of a major proportion of isobutylene with a minor proportion of a polyolefin having 4 to 12, inclusive, carbon atoms per molecule and finely divided calcium silicate having an average particle size less than one micron and having a ratio of $SiO_2$ to CaO not less than 2 to 1 nor more than 4 to 1, the improvement which comprises adding in small amount, sufficient to diminish stickiness but not over 5 percent by weight based upon the weight of the interpolymer, of diethylene glycol bis (butoxyethyl) carbonate.

5. In the milling of a hydrocarbon interpolymer of a major proportion of isobutylene with a minor proportion of a polyolefin having 4 to 12, inclusive, carbon atoms per molecule, the improvement which comprises milling the interpolymer with an ester of (a) a polyhydroxy saturated aliphatic compound and (b) an acid ester of carbonic acid and a monohydroxy saturated aliphatic compound; wherein at least two hydroxy groups of (a) are esterified with (b).

6. In the milling of a hydrocarbon interpolymer of a major proportion of isobutylene with a minor proportion of a polyolefin having 4 to 12, inclusive, carbon atoms per molecule, the improvement which comprises milling the interpolymer with an ester of (a) a polyhydroxy saturated aliphatic compound and (b) an acid ester of carbonic acid and a monohydroxy saturated aliphatic compound; wherein at least two hydroxy groups of (a) are esterified with (b), and wherein the milling is continued until a preponderant amount of the ester has bled from the interpolymer.

7. A vulcanizable rubber composition comprising a hydrocarbon interpolymer of a major proportion of isobutylene with a minor proportion of isoprene, finely divided calcium silicate having an average particle size less than one micron and having a ratio of $SiO_2$ to CaO not less than 2 to 1 nor more than 4 to 1, and a small amount, sufficient to diminish stickiness but not over 5 percent by weight based on the weight of the interpolymer, of a carbonate ester of (a) a polyhydroxy saturated aliphatic compound in which the hydroxy groups are esterifiable with acids and (b) an acid ester of carbonic acid and an aliphatic saturated monohydroxy compound which contains a single hydroxy group which is esterifiable with acids; wherein the hydroxy groups of (a) are esterified with (b).

8. A vulcanizable rubber composition comprising a hydrocarbon interpolymer of a major proportion of isobutylene with a minor proportion of butadiene, finely divided calcium silicate having an average particle size less than one micron and having a ratio of $SiO_2$ to CaO not less than 2 to 1 nor more than 4 to 1, and a small amount, sufficient to diminish stickiness but not over 5 percent by weight based on the weight of the interpolymer, of a carbonate ester of (a) a polyhydroxy saturated aliphatic compound in which the hydroxy groups are esterifiable with acids and (b) an acid ester of carbonic acid and an aliphatic saturated monohydroxy compound which contains a single hydroxy group which is esterifiable with acids; wherein the hydroxy groups of (a) are esterified with (b).

9. A vulcanizable rubber composition comprising a hydrocarbon interpolymer of a major proportion of isobutylene with a minor proportion of dimethyl butadiene, finely divided calcium silicate having an average particle size less than one micron and having a ratio of $SiO_2$ to CaO not less than 2 to 1 nor more than 4 to 1, and a small amount, sufficient to diminish stickiness but not over 5 percent by weight based on the weight of the interpolymer, of a carbonate ester of (a) a polyhydroxy saturated aliphatic compound in which the hydroxy groups are esterifiable with acids and (b) an acid ester of carbonic acid and an aliphatic saturated monohydroxy compound which contains a single hydroxy group which is esterifiable with acids; wherein the hydroxy groups of (a) are esterified with (b).

10. The rubber vulcanization product of claim 1 wherein the polyolefin is pentadiene.

11. The rubber vulcanization product of claim 1 wherein the polyolefin is cyclopentadiene.

FREDERICK W. GAGE.

REFERENCES CITED

The following references are of record in the file of this patent:

Pages 3, 5 and 9 and Tables VII and X, Compounding and Processing of Butyl Rubber, Stanco Distributors, Inc., Chemical Products Dept., New York, New York. Received in Patent Office August 13, 1942.

Pages 142 and 144, Chemical and Metallurgical Engineering, July 1945.